(12) United States Patent
Brooks

(10) Patent No.: US 10,448,628 B2
(45) Date of Patent: Oct. 22, 2019

(54) ELECTRONIC START SYSTEM FOR AN AGRICULTURAL MACHINE

(71) Applicant: CNH Industrial America LLC, New Holland, PA (US)

(72) Inventor: Nathan Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 390 days.

(21) Appl. No.: 15/470,033

(22) Filed: Mar. 27, 2017

(65) Prior Publication Data

US 2018/0274465 A1   Sep. 27, 2018

(51) Int. Cl.

| F02N 11/08 | (2006.01) |
| F02N 11/10 | (2006.01) |
| A01M 7/00 | (2006.01) |
| B60N 2/00 | (2006.01) |

(52) U.S. Cl.
CPC .......... *A01M 7/0089* (2013.01); *B60N 2/002* (2013.01); *F02N 11/0803* (2013.01); *F02N 11/101* (2013.01); *F02N 11/103* (2013.01); *F02N 2200/106* (2013.01)

(58) Field of Classification Search
CPC ............ B60W 2300/15; B60G 2300/08; F16C 2310/00
See application file for complete search history.

(56) References Cited

U.S. PATENT DOCUMENTS

| 1,669,264 | A | * | 5/1928 | Reis | .......................... | B23B 5/12 |
| | | | | | | 269/228 |
| 4,016,052 | A | * | 4/1977 | Tokumoto | ................. | C25C 3/00 |
| | | | | | | 205/148 |
| 5,751,073 | A | * | 5/1998 | Ross | ....................... | B60R 25/04 |
| | | | | | | 123/179.2 |
| 6,380,642 | B1 | * | 4/2002 | Buchner | ........... | B60R 25/02153 |
| | | | | | | 307/10.3 |
| 7,141,889 | B2 | * | 11/2006 | Takezaki | ................. | B60R 25/04 |
| | | | | | | 307/10.3 |
| 7,216,616 | B2 | * | 5/2007 | Asada | ................. | F02N 11/0803 |
| | | | | | | 123/179.3 |

(Continued)

FOREIGN PATENT DOCUMENTS

| EP | 1669264 A1 | 5/2007 |
| KR | 19980017681 | 7/1998 |

*Primary Examiner* — Thomas G Black
*Assistant Examiner* — Ana D Thomas
(74) *Attorney, Agent, or Firm* — Rebecca L. Henkel; Rickard K. DeMille

(57) ABSTRACT

An electronic start system for an agricultural machine is configured to enable the machine to stop the engine while continuing to power onboard electronics and start the engine so long as one or more sensed conditions are met. The system can include a key lock operated by a physical key held by an operator and a button which can be pressed by the operator. The system can also include one or more sensors disposed on the machine for detecting various conditions. When the key is turned on, power can be provided to the onboard electronics, regardless of the state of the engine. Thereafter, when the button is pressed, the engine can be turned on if the one or more sensed conditions are satisfied, such as detecting a closed door, an operator in a seat, an activated brake, and so forth.

20 Claims, 3 Drawing Sheets

(56) References Cited

U.S. PATENT DOCUMENTS

| | | | | |
|---|---|---|---|---|
| 7,262,683 B2* | 8/2007 | Maeda | ............... | B60R 25/04 340/3.7 |
| 7,290,416 B2* | 11/2007 | Ohtaki | ............... | B60R 25/04 200/43.08 |
| 7,378,752 B2* | 5/2008 | Ozawa | ............... | B60R 25/045 307/10.2 |
| 7,498,688 B2* | 3/2009 | Kamiya | ............... | B60R 25/02153 307/10.2 |
| 7,521,819 B2* | 4/2009 | Narayanaswami | ..... | B60R 25/04 307/10.6 |
| 7,576,636 B2* | 8/2009 | Dornbach | ............... | B60R 25/04 200/43.18 |
| 7,652,391 B2* | 1/2010 | Kim | ............... | H01H 27/08 307/10.3 |
| 7,886,706 B2* | 2/2011 | Grybush | ............... | B60R 25/04 123/179.24 |
| 8,482,382 B2* | 7/2013 | Lickfelt | ............... | B60R 25/04 307/10.1 |
| 8,972,152 B2* | 3/2015 | Boesch | ............... | F02N 11/0837 123/179.2 |
| 2013/0110376 A1* | 5/2013 | Surnilla | ............... | F02D 41/042 701/103 |
| 2015/0260141 A1* | 9/2015 | Fujita | ............... | F02N 11/105 290/380 |

* cited by examiner

ELECTRONIC START SYSTEM FOR AN AGRICULTURAL MACHINE

FIELD OF THE INVENTION

The invention relates generally to agricultural machines such as self-propelled sprayers and, in particular, to an electronic start system for agricultural machines in which a system controller is operable to detect states of a key lock and a button in order to provide power to electrical systems, regardless of whether an engine is actively running, and to prevent activation the engine unless the key lock, the button and a sense condition are satisfied.

BACKGROUND OF THE INVENTION

Agricultural machines, such as high-clearance sprayers, are getting larger and more complex to allow for increasing coverage in a single pass, which improves application efficiency. These machines often have sophisticated product delivery and other systems that are electronically controlled. Currently, sprayer starter systems have keyed starter switches and mechanical relays as safety locks to prevent starting in certain circumstances. As sprayers and their systems get more complex, there are more circumstances in which preventing starting could be beneficial, so more mechanical relays as safety locks are being implemented. However, this adds cost to the system and requires additional time for assembly. Moreover, turning the key off turns off power to electrical components. This means that the operator must shut down his controls any time he wants to start or stop his engine. This is undesirable in many circumstances, such as when using a field computer which requires loading maps, guidance lines, and so forth. A need therefore exists for an improved system which eliminates one or more of the foregoing disadvantages.

SUMMARY OF THE INVENTION

An electronic start system for an agricultural machine is configured to enable the machine to stop the engine while continuing to power onboard electronics and start the engine so long as one or more sensed conditions are met. The system can include a key lock operated by a physical key held by an operator and a button which can be pressed by the operator. The system can also include one or more sensors disposed on the machine for detecting various conditions. When the key is turned on, power can be provided to the onboard electronics, regardless of the state of the engine. Thereafter, when the button is pressed, the engine can be turned on if the one or more sensed conditions are satisfied, such as detecting a closed door, an operator in a seat, an activated brake, and so forth.

Accordingly, an aspect of the invention can provide a push button start with relationship to a machine controller on sprayers that will enable safe starting of the engine and allow for electronics to stay functional on, during, and after engine running. Instead of a keyed starter switch and mechanical relays, the starter system can provide a push button starter switch and electronic safety locks. The electronic safety locks can sense conditions and allow or prevent starting based on conditions, without mechanical relays. This can allow the key to stay at an on position, keeping the electronics live while preventing starting under certain circumstances. Keeping the electronics live can allow an operator to use one or more computer(s)/controller(s) during non-operation of the sprayer to, for example, load maps into the computer(s)/controller(s) for the next job(s) while loading product into the tanks. Then, when it is time to start the engine, the operator can simply press the start button.

Specifically then, one aspect of the present invention can provide an electronic start system for an agricultural machine including: a key lock operable to switch between a first lock state and a second lock state; a button operable to switch between a first button state and a second button state; a power distribution circuit configured to provide power to multiple electrical systems of the agricultural machine; a starter circuit configured to provide activation or deactivation of an engine of the agricultural machine; an electronic sensor configured to detect a presence or absence of a condition with respect to the agricultural machine; and a system controller in communication with the key lock, the button, the power distribution circuit, the starter circuit, and the electronic sensor. The system controller can execute a program stored in a non-transient medium operable to: (a) detect the key lock in the first lock state or the second lock state; (b) control the power distribution circuit to provide power to the multiple electrical systems when the key lock is in the first lock state and remove power from the multiple electrical systems when the key lock is in the second lock state; (c) detect the button in the first button state or the second button state; and (d) control the starter circuit to: (i) prevent activation of the engine unless the key lock is in the first lock state, the button is in the first button state and the electronic sensor detects a presence of the condition, and (ii) allow deactivation of the engine when the key lock is in the second lock state or the button is in the second button state.

Another aspect can provide a method for electronically starting an agricultural machine having a key lock operable to switch between a first lock state and a second lock state, a button operable to switch between a first button state and a second button state, a power distribution circuit for providing power to multiple electrical systems of the agricultural machine, a starter circuit for providing activation or deactivation of an engine of the agricultural machine, and an electronic sensor for detecting a presence or absence of a condition with respect to the agricultural machine. The method can include: (a) detecting the key lock in a first lock state or a second lock state; (b) controlling the power distribution circuit to provide power to the multiple electrical systems when the key lock is in the first lock state and remove power from the multiple electrical systems when the key lock is in the second lock state; (c) detecting the button in the first button state or the second button state; and (d) controlling the starter circuit to: (i) prevent activation of the engine unless the key lock is in the first lock state, the button is in the first button state and the electronic sensor detects a presence of the condition, and (ii) allow deactivation of the engine when the key lock is in the second lock state or the button is in the second button state.

Another aspect may provide an agricultural sprayer including: a chassis supported by multiple wheels, the chassis supporting an engine, a drive system, a lift arm assembly and an operator cab; a sprayer boom connected to the lift arm assembly; a key lock in the operator cab operable to switch between a first lock state and a second lock state; a button in the operator cab operable to switch between a first button state and a second button state; a power distribution circuit configured to provide power to multiple electrical systems of the sprayer; a starter circuit configured to provide activation or deactivation of the engine; an electronic sensor configured to detect a presence or absence of a condition with respect to the sprayer; and a system controller in communication with the key lock, the button, the power distribution circuit, the starter circuit, and the electronic sensor. The system controller can execute a program stored in a non-transient medium operable to: (a) detect the key lock in the first lock state or the second lock state; (b) control the power distribution circuit to provide power to the multiple electrical systems when the key lock is in the first lock state and remove power from the multiple electrical systems when the key lock is in the second lock state; (c) detect the button in the first button state or the second button state; and (d) control the starter circuit to: (i) prevent activation of the engine unless the key lock is in the first lock state, the button is in the first button state and the electronic sensor detects a presence of the condition, and (ii) allow deactivation of the engine when the key lock is in the second lock state or the button is in the second button state.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
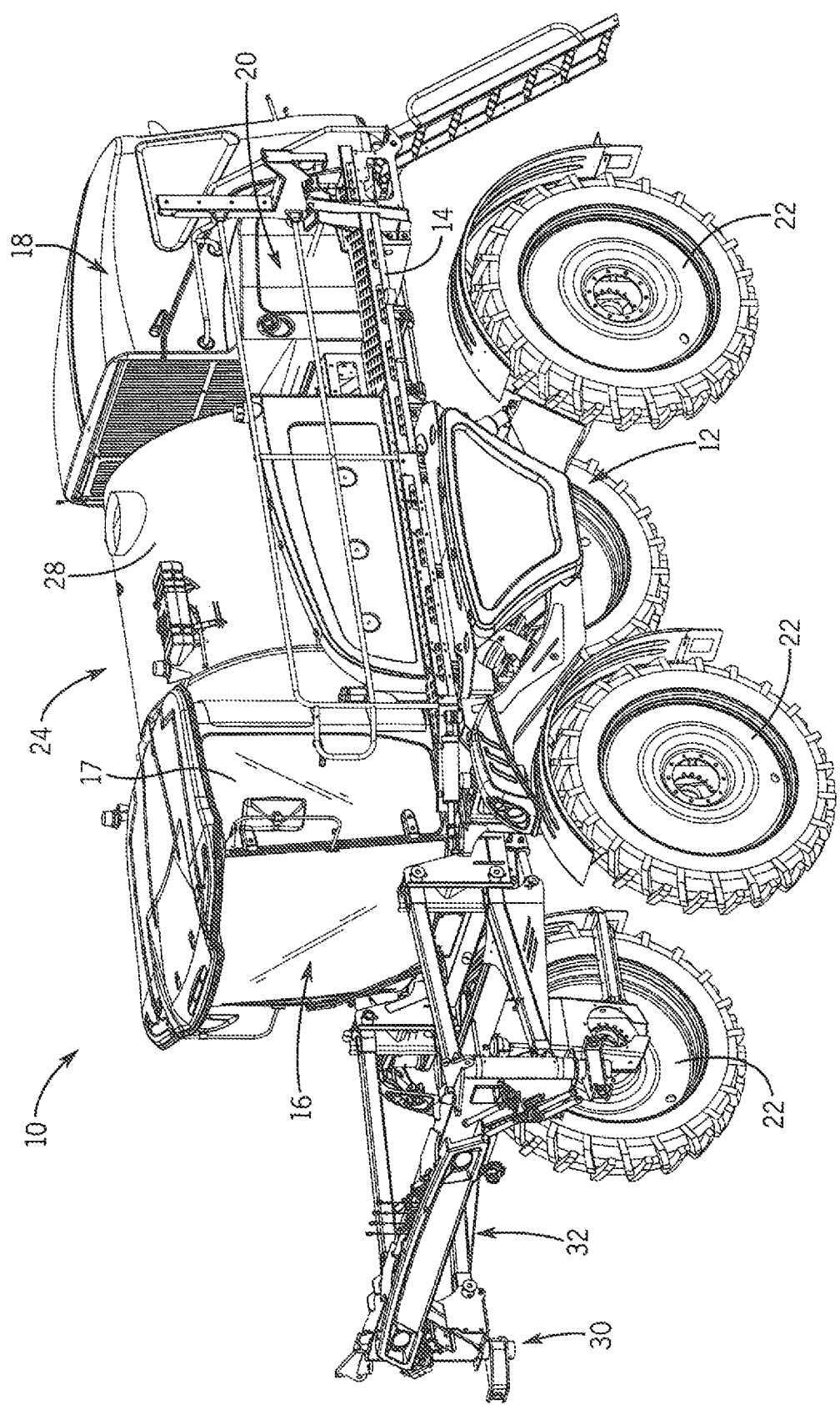
FIG. 1 is an isometric view of an agricultural machine in accordance with an aspect of the invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, a spray system 24, and an engine compartment 17 housing an engine area, including an engine 18 and a hydraulic system 20, among other things. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. The spray system 24 can include storage containers such as rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

Figure 2:
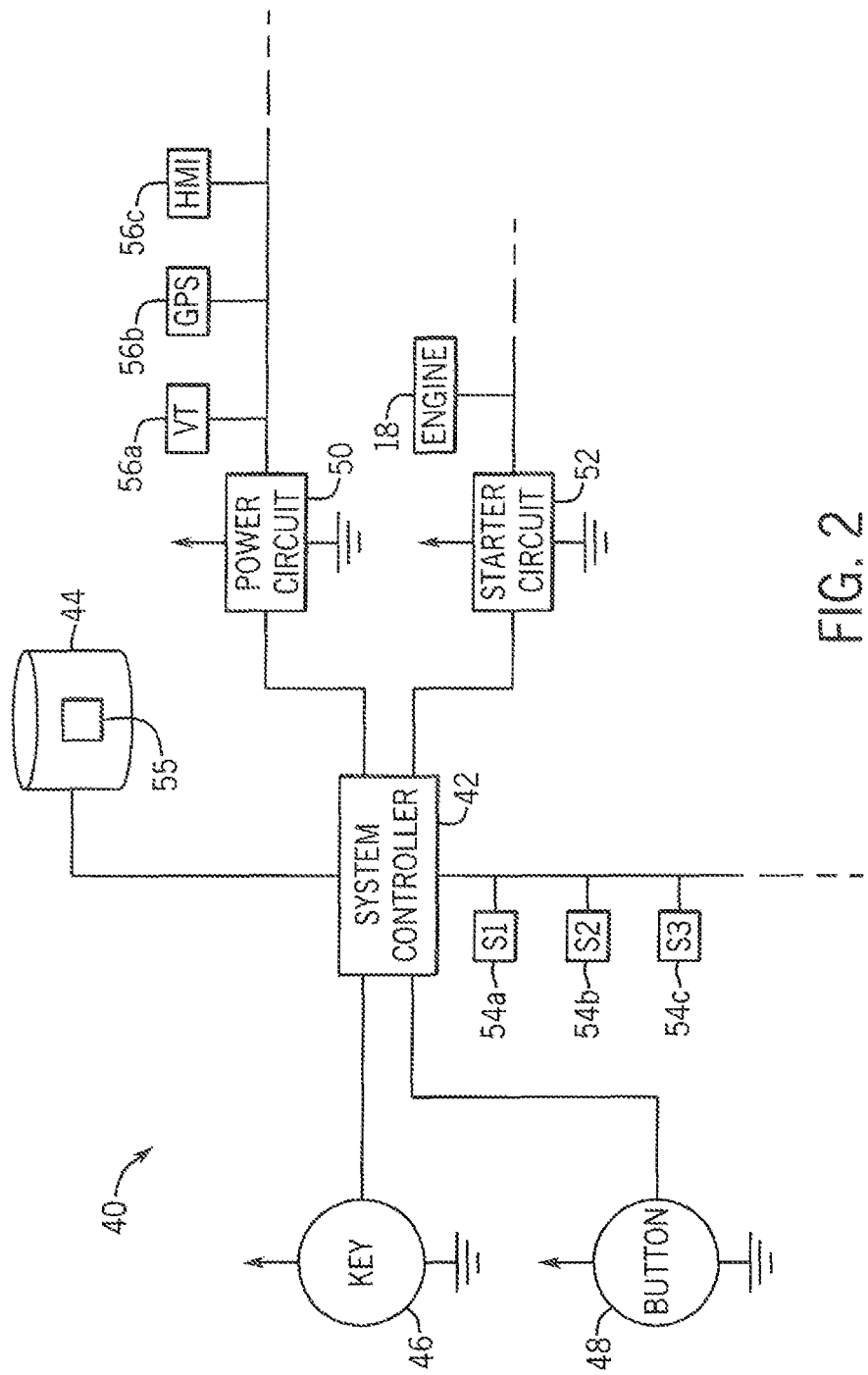
FIG. 2 is block diagram of an electronic start system in accordance with an aspect of the invention which can be implemented with respect to an agricultural machine, such as the machine of FIG. 1.

Referring now to FIG. 2, a block diagram of an electronic start system 40, which can be implemented with respect to the sprayer 10, is provided in accordance with an aspect of the invention. The electronic start system 40 can include a system controller 42 in communication with a data structure 44, a key lock 46, a button 48, a power distribution circuit 50, a starter circuit 52, and one or more electronic sensors 54, such as a first electronic sensor 54a (labelled "S1"), a second electronic sensor 54b (labelled "S2"), a third electronic sensor 54c (labelled "S3"), and so forth. The system controller 42 can be a microprocessor, a microcontroller or other programmable logic element configured to execute a program 55 stored in the data structure 44 which can be a non-transient medium as known the art. The key lock 46 can be operable to switch between a first lock state, such as a positive voltage reference when an operator turns the key lock to an "on" position using a physical key, and a second lock state, such as a negative voltage reference or ground when the operator turns the key lock to an "off" position using the physical key. The key lock 46 can be located in the operator cab 16. The button 48 can be operable to switch between a first button state, such as a positive voltage reference when an operator pushes or presses the button to an "on" position, and a second button state, such as a negative voltage reference or ground when the operator pushes or presses the button to an "off" position. The button 48 can also be located in the operator cab 16, preferably in close proximity to the key lock 46.

The power distribution circuit 50 can be configured to provide electrical power to, or remove electrical power from, multiple electrical systems 56 of the sprayer 10. Such electrical systems could include, for example: a first electrical system 56a, which could be a Virtual Terminal (VT) or field computer operable for tracking information relating agricultural treatment of a field and/or controlling systems of the sprayer 10, such as the spray system 24, the boom 30, and the like; a second electrical system 56b, which could be a Global Positioning System (GPS) for receiving real time location information and/or plotting such location information with respect to a mapping system; a third electrical system 56c, which could be a Human Machine Interface (HMI) touchscreen for an operator to communicate I/O with various controls of the sprayer 10, including the system controller 42; a fourth electrical system, which could be power for the spray system 24; a fifth electrical system, which could be power for the boom 30; and the like. Accordingly, the system controller 42 can control the power distribution circuit 50 to provide such power to, or remove such power from, the aforementioned electrical systems.

The starter circuit 52 can be configured to enable activation or deactivation of the engine 18 and/or related aspects, such as the hydraulic system 20. Accordingly, the system controller 42 can control the starter circuit 52 to prevent activation of the engine 18, or allow deactivation of the engine, as desired.

The electronic sensors 54 can be configured to detect a presence or absence of various conditions with respect to the sprayer 10. For example: one electronic sensor could be configured to detect a presence of a condition corresponding to a closed door of the operator cab 16, such as by way of a Hull effect sensors positioned with respect to the door and the cab; another electronic sensor could be configured to detect a presence of a condition corresponding to an operator in a seat of the operator cab 16, such as by way of a pressure sensor configured with respect to the seat; another electronic sensor could be configured to detect a presence of a condition corresponding to an activated brake, such as by way of a pressure sensor configured with respect to a brake pedal; another electronic sensor could be configured to detect a presence of a condition corresponding to a transmission gear, such as a gear selection switch being detected in neutral; another electronic sensor could be configured to detect a presence of a condition corresponding to an absence of a fault codes corresponding to the engine 18 and/or related aspects, such as the hydraulic system 20, representing a lack of any check engine codes and/or warnings. It will be appreciated that variety of such electronic sensors can be implemented in many different ways, and in various combinations, within the scope of the invention.

In accordance with an aspect of the invention, the system controller 42 can execute to detect the key lock 46 being in the first lock state ("on" position) or the second lock state ("off" position using). The system controller 42 can also execute to detect the button 48 in the first button state ("on" position) or the second button state ("off" position). The system controller 42 can continuously monitor states of the key lock 46 and the button 48 and provide adjustments accordingly.

The system controller 42 can then execute to control the power distribution circuit 50 and the starter circuit 52 based on the states of the key lock 46 and the button 48. In particular, the system controller 42 can control the power distribution circuit 50 to provide power to the electrical systems 56 when the key lock 46 is in the first lock state and remove power from the electrical systems 56 when the key lock 46 is in the second lock state. This selection of power can be completely independent from the button 48. In addition, the system controller 42 can control the starter circuit 52 to prevent activation of the engine 18 unless the key lock 46 is in the first lock state ("on" position) and the button is in the first button state ("on" position). The system controller 42 can also control the starter circuit 52 to prevent activation of the engine 18 until one or more of the electronic sensors 54 detects a presence of a predetermined condition as desired, such as a closed door, an operator in a seat, an activated brake, a gear in neutral, an absence of a fault code, and so forth. The system controller 42 can also control the starter circuit 52 to allow deactivation of the engine 18 when either the key lock 46 is in the second lock state ("off" position) or the button is in the second button state ("off" position). This may advantageously allow a key to stay in the key lock 46 at an on position, thereby keeping onboard electronics live, while avoiding starting of the engine 18.

Figure 3:
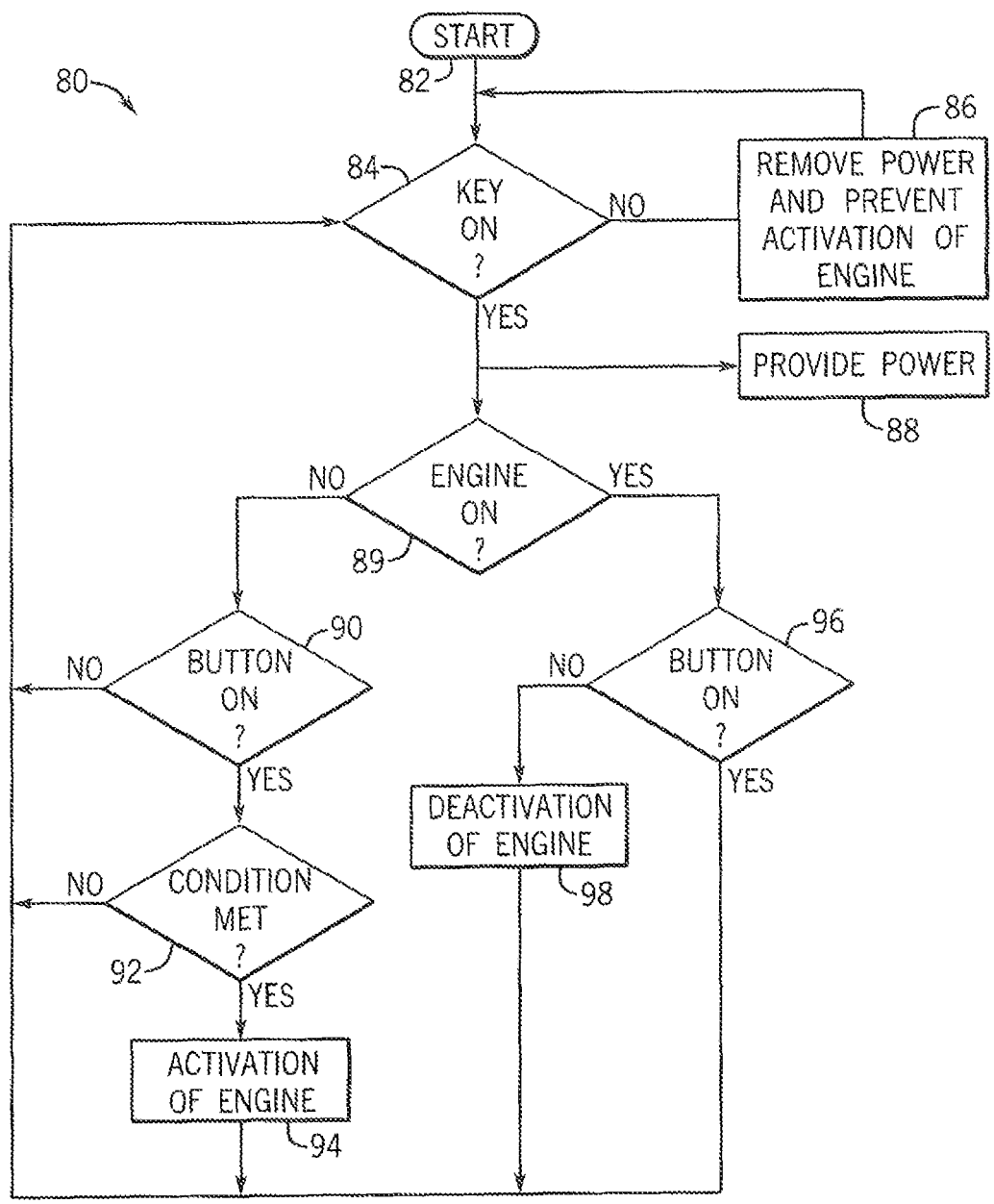
FIG. 3 is a flow diagram which can be implemented by the electronic start system of FIG. 2.

Referring now to FIG. 3, a flow diagram 80 (process) which can be implemented with respect to the electronic start system 40 is provided in accordance with an aspect of the invention. At step 82, the system controller 42 can begin executing the program 55, thereby proceeding to a key lock decision block 84. At the key lock decision block 84, the system controller 42 can determine a current state of the key lock 46, such as whether the key lock 46 is in a first lock state ("on" position) or a second lock state ("off" position). If the key lock 46 is not in the first lock state, but rather in the in the second lock state, the process can continue to block 86 in which the power distribution circuit 50 is controlled to remove electrical power from the electrical systems 56, and the starter circuit 52 is controlled to prevent activation of the engine 18. The process can then return again to the key lock decision block 84, and the process can continuously loop so long as the key lock 46 is in the second lock state ("off" position).

However, if at the key lock decision block 84 it is determined that the key lock 46 is in the first lock state ("on" position), the process can continue in parallel to block 88 in which the power distribution circuit 50 is controlled to provide electrical power to the electrical systems 56, and to an engine decision block 89. At the engine decision block 89, the system controller 42 can determine a current state of the engine 18, such as whether the engine 18 is in an active state ("on" or running) or an inactive state ("off" or stopped). If the engine 18 is in an inactive state, the process can continue to a button decision block 90. At the button decision block 90 (engine off), the system controller 42 can determine a current state of the button 48, such as whether the button 48 is in a first button state ("on" position) or a second button state ("off" position). If the button 48 is in the second button state, the process can return to the key lock decision block 84, and continue to loop with electrical power being provided to the electrical systems 56. However, if at the button decision block 90 the system controller 42 determines that the button 48 is in a first button state, the process can continue to a condition decision block 92. At the condition decision block 92, the system controller 42 can determine whether one or more predetermined conditions have been satisfied ("presence"), or whether such conditions have not been satisfied ("absence"). As described with respect to FIG. 2, such conditions could include, for example, a closed door, an operator in a seat, an activated brake, a gear in neutral, an absence of a fault code, and so forth. The system controller 42 can monitor one or more electronic sensors 54 to detect such presence or absence of conditions with respect to the sprayer 10. If any predetermined condition is absent (has not been satisfied), the process can return to the key lock decision block 84, without activation of the engine 18, and continue to loop with electrical power being provided to the electrical systems 56. However, if at the condition decision block 92 the system controller 42 determines that all predetermined conditions are present (have been satisfied), the process can continue to a block 94, with the engine 18 being allowed to activate, and the process can return to the key lock decision block 84 for continuous state monitoring.

However, if at the engine decision block 89 it is determined that the engine 18 is in an active state ("on" or running), the process can continue the process can continue to another button decision block 96. At the button decision block 96 (engine on), the system controller 42 can determine a current state of the button 48, such as whether the button 48 is in the first button state ("on" position) or the second button state ("off" position). If the button 48 is in the first button state, the process can return to the key lock decision block 84, with the engine 18 active, and continue to loop with electrical power being provided to the electrical systems 56. In another aspect, if a predetermined condition is found to be absent (has not been satisfied or is no longer satisfied), the process can provide deactivation of the engine 18 before returning to the key lock decision block 84. However, if at the button decision block 96 the system controller 42 determines that the button 48 is in the second button state ("off" position), the process can continue to a block 98 in which the process allows or provides deactivation of the engine.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

I claim:

1. An electronic start system for an agricultural machine comprising:
    a key lock operable to switch between a first lock state and a second lock state;
    a button operable to switch between a first button state and a second button state;
    a power distribution circuit configured to provide power to a plurality of electrical systems of the agricultural machine;
    a starter circuit configured to provide activation or deactivation of an engine of the agricultural machine;
    an electronic sensor configured to detect a presence or absence of a condition with respect to the agricultural machine; and
    a system controller in communication with the key lock, the button, the power distribution circuit, the starter circuit, and the electronic sensor, the system controller executing a program stored in a non-transient medium operable to:
    (a) detect the key lock in the first lock state or the second lock state;
    (b) control the power distribution circuit to provide power to the plurality of electrical systems when the key lock is in the first lock state and remove power from the plurality of electrical systems when the key lock is in the second lock state;
    (c) detect the button in the first button state or the second button state; and
    (d) control the starter circuit to: (i) prevent activation of the engine unless the key lock is in the first lock state, the button is in the first button state and the electronic sensor detects a presence of the condition, and (ii) allow deactivation of the engine when the key lock is in the second lock state or the button is in the second button state.

2. The system of claim 1, wherein the plurality of electrical systems include at least one of a Virtual Terminal (VT) and a Global Positioning System (GPS).

3. The system of claim 2, wherein the plurality of electrical systems further include a Human Machine Interface (HMI) touchscreen.

4. The system of claim 2, wherein the plurality of electrical systems further include a lift arm assembly system.

5. The system of claim 1, wherein the condition is a closed door.

6. The system of claim 1, wherein the condition is an operator in a seat.

7. The system of claim 1, wherein the condition is an activated brake.

8. The system of claim 1, wherein the condition is a gear in neutral.

9. The system of claim 1, wherein the condition is an absence of a fault code corresponding to the engine.

10. The system of claim 1, wherein the electronic sensor is a first electronic sensor and the condition is a first condition, and further comprising a second electronic sensor configured to detect a presence or absence of a second condition with respect to the agricultural machine, wherein the system controller is further operable to control the starter circuit to prevent activation of the engine unless the second electronic sensor detects a presence of the second condition.

11. The system of claim 1, wherein the system controller is further operable to control the starter circuit to provide deactivation of the engine when the electronic sensor detects an absence of the condition.

12. A method for electronically starting an agricultural machine having a key lock operable to switch between a first lock state and a second lock state, a button operable to switch between a first button state and a second button state, a power distribution circuit for providing power to a plurality of electrical systems of the agricultural machine, a starter circuit for providing activation or deactivation of an engine of the agricultural machine, and an electronic sensor for detecting a presence or absence of a condition with respect to the agricultural machine, the method comprising:
    (a) detecting the key lock in a first lock state or a second lock state;
    (b) controlling the power distribution circuit to provide power to the plurality of electrical systems when the key lock is in the first lock state and remove power from the plurality of electrical systems when the key lock is in the second lock state;
    (c) detecting the button in the first button state or the second button state; and
    (d) controlling the starter circuit to: (i) prevent activation of the engine unless the key lock is in the first lock state, the button is in the first button state and the electronic sensor detects a presence of the condition, and (ii) allow deactivation of the engine when the key lock is in the second lock state or the button is in the second button state.

13. The method of claim 12, wherein the plurality of electrical systems include at least one of a Virtual Terminal (VT) and a Global Positioning System (GPS).

14. The method of claim 13, wherein the plurality of electrical systems further include a lift arm assembly system.

15. The method of claim 12, wherein the condition is at least one of a closed door and an operator in a seat.

16. The method of claim 12, wherein the electronic sensor is a first electronic sensor and the condition is a first condition, and further comprising a second electronic sensor configured to detect a presence or absence of a second condition with respect to the agricultural machine, wherein step (d) further comprises controlling the starter circuit to prevent activation of the engine unless the second electronic sensor detects a presence of the second condition.

17. The method of claim 12, further comprising controlling the starter circuit to provide deactivation of the engine when the electronic sensor detects an absence of the condition.

18. An agricultural sprayer comprising:
a chassis supported by a plurality of wheels, the chassis supporting an engine, a drive system, a lift arm assembly and an operator cab;
a sprayer boom connected to the lift arm assembly;
a key lock in the operator cab operable to switch between a first lock state and a second lock state;
a button in the operator cab operable to switch between a first button state and a second button state;
a power distribution circuit configured to provide power to a plurality of electrical systems of the sprayer;
a starter circuit configured to provide activation or deactivation of the engine;
an electronic sensor configured to detect a presence or absence of a condition with respect to the sprayer; and
a system controller in communication with the key lock, the button, the power distribution circuit, the starter circuit, and the electronic sensor, the system controller executing a program stored in a non-transient medium operable to:
(a) detect the key lock in the first lock state or the second lock state;
(b) control the power distribution circuit to provide power to the plurality of electrical systems when the key lock is in the first lock state and remove power from the plurality of electrical systems when the key lock is in the second lock state;
(c) detect the button in the first button state or the second button state; and
(d) control the starter circuit to: (i) prevent activation of the engine unless the key lock is in the first lock state, the button is in the first button state and the electronic sensor detects a presence of the condition, and (ii) allow deactivation of the engine when the key lock is in the second lock state or the button is in the second button state.

19. The sprayer of claim 18, wherein the electronic sensor is a first electronic sensor and the condition is a first condition, and further comprising a second electronic sensor configured to detect a presence or absence of a second condition with respect to the sprayer, wherein the system controller is further operable to control the starter circuit to prevent activation of the engine unless the second electronic sensor detects a presence of the second condition.

20. The sprayer of claim 18, wherein the system controller is further operable to control the starter circuit to provide deactivation of the engine when the electronic sensor detects an absence of the condition.

* * * * *